July 31, 1945.  K. KLOPFER  2,380,450

ELECTRODE FEEDING APPLIANCE

Filed Jan. 13, 1942

INVENTOR
KARL KLOPFER
By
ATTORNEYS

Patented July 31, 1945

2,380,450

UNITED STATES PATENT OFFICE 2,380,450

ELECTRODE FEEDING APPLIANCE

Karl Klopfer, Zurich-Oerlikon, Switzerland, assignor to the firm Holding Intercito, Zurich, Switzerland, a company of Panama Application January 13, 1942, Serial No. 426,650
In Germany January 15, 1941

4 Claims. (Cl. 198—43)

The present invention refers to an apparatus for feeding electrode rods of equal size to be turned into welding electrodes for use in electric welding. The feeding of rods of identical size into the coating apparatus was hitherto connected with certain difficulties. Since these rods are not perfectly straight and have a rough surface they are apt to form bridges in the feeding funnel, thus hitherto preventing continuous feeding of the rods.

Now, in the present invention these difficulties are eliminated by the provision of a funnel constituted by adjustable guides and leading to a narrow vertical duct of which the closing part is constituted by at least two conical rollers or drums. The support of the rear end of the rod runs aslant downwards, whilst the front guide of the rod end has at its bottom end a forward step sized to accommodate one rod diameter. Moreover, the top part of the conical rollers or drums is made eccentric so as to act as shaking apparatus or vibrator. To sum up, the whole arrangement operates in such a manner that whilst the lowermost rod is carried towards the coating apparatus, the one immediately following is carried forward into the step of the front guide, thus losing its support at the rear end and only supported at the front end by the lowermost rod, so as to cause it to drop into the zone of action of the conical rollers or drums and to be carried along by these as soon as the lowermost rod has left the rollers.

The enclosed drawing shows a constructional example of the invention.

Figure 1:
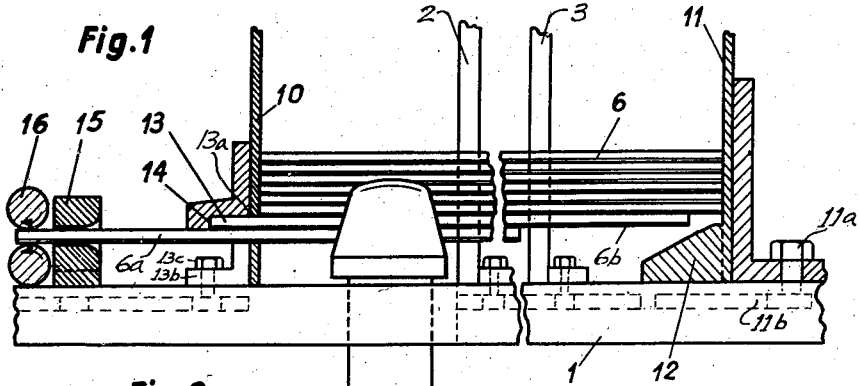

Fig. 1 is an elevation of the feeding apparatus.

Figure 2:
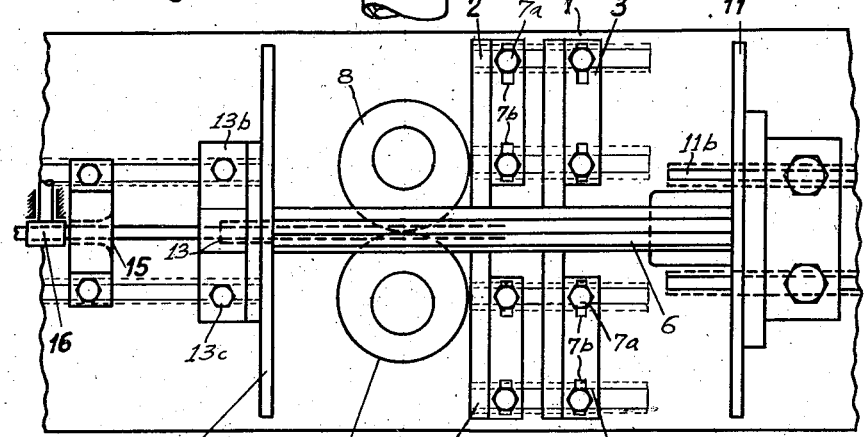
Figure 3:
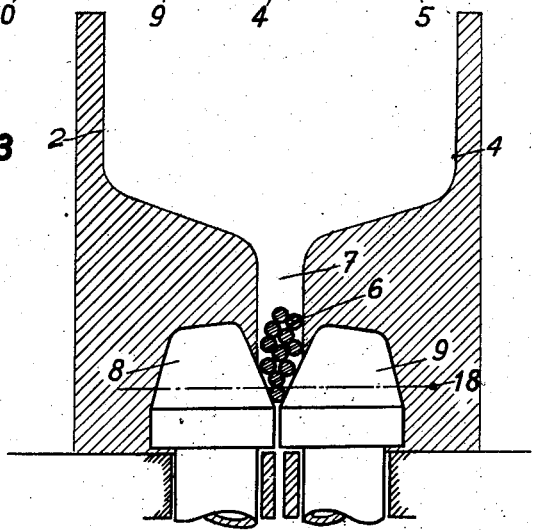

Fig. 2 a view from above of the feeding apparatus,

Fig. 3 shows the funnel and conical rollers in end elevation.

On the table top 1 are screwed vertical adjustable guides 2, 3, 4 and 5. These guides form a funnel for the rods 6. The bottom ends of these guides are vertical and form a slot 7 with parallel walls and width dimensioned so as to hold at least slightly more than two rods lying abreast, the width of the slot being adjustable by means of the bolts 7a and slots 7b. The bottom part of this slot 7 is closed adjacent to the lower end by two conical rollers or drums 8 and 9, leaving between them a variable clearance and so arranged that their respective thickest parts are nearly in contact. These conical rollers or drums run true up to the height indicated on Fig. 3 by the dash-and-dot line 18. Above this line the cross-section of the cones of the rollers 8 and 9 are eccentric. These eccentric parts of the rollers constitute a shaking means for joggling the rods so as to prevent them from becoming stuck in the slot 7. The top ends of the cones are shaped as slanting caps arranged at an angle to the cone axis and also contributing to keep in motion the rods in the slot 7. The rods 6 are guided at their ends by the walls 10 and 11. The rear wall 11 is adjustable in order to fit the rod length by means of bolts 11a and longitudinal slots 11b and is provided with a support 12 running aslant downwards and intended for the rods 6. The front wall 10 is provided with a step 13 so sized as to accommodate one rod diameter and limited in front by the stop 14, the step 13 and wall 10 having an opening 13a through which the rod enters. The wall 10 with its step 13 is adjustaby secured to the table 1 by angles 13b and bolts 13c.

Fig. 3 shows the manner in which the rollers or drums 8 and 9 act as the bottom closure of slot 7. As and when the rollers are set rotating, and as a result of the alternate narrowing and widening of the feeding funnel under the action of the non-circular roller parts, the rods are subjected to a joggling motion and loosened, thus securing a continuous feed. The axis of the two rollers 8 and 9 are held in, and perpendicular to, the table top 1; they may be inclined forward or backward so as to secure in each case the most favourable working conditions. These conical rollers may be driven by a gear-wheel drive, which latter is not shown on the drawing. It will be evident that the axes of both rollers will be so disposed that the distance between them, and especially the width of the funnel formed by the cones of the rollers, will be dimensioned in dependence upon the diameter of the rods or electrodes with which the apparatus is to be used.

Regarding the guides 2, 3, 4 and 5 it should be pointed out that the rear guides 3 and 5 can be adjusted so as to leave between them a wider clearance than between the front guides 2 and 4, so that at the back the rods will be slightly looser and therefore drop more easily. Instead of separate guides broad sheet-iron guides may also be used.

The working process is as follows:

The funnel is filled with rods 6, as shown on Fig. 1. The wall 11 is adjusted to fit the rod length. The bottom rod 6a drops between the two conical rollers 8 and 9 until it is caught up by these and carried towards the transport rollers 16 through the nozzle 15, the rod resting, if desired, upon the lower portion of wall 10. The second lowest rod 6ᵇ resting on the bottom rod is carried through adhesion together with this latter into the step 13 of the front wall 10 until it is checked by the stop 14. Since the rear rod support 12 has a forward slant the rear rod end remains unsupported as a result of this advance.

Now, as soon as the lowermost rod has progressed so far that it does not support any longer the second lowest rod resting on it, this second lowest rod drops into the slot formed by the rollers 8 and 9, is caught up by these and carried forward, so that the second rod immediately follows the first.

What I claim and desire to secure by Letters Patent is:

1. Feeding apparatus for electrode rods and the like, comprising transversely spaced guides having opposed inner edges inclined inwardly and downwardly toward each other and then substantially vertically downward to form a funnel-shaped space which is closed at one portion of its lower end by at least two conical feed rollers, a support at the rear end having its upper surface running obliquely forward and downward, and a front wall having an opening therein and provided with a front guide for the forward rod end provided at its bottom with a forward step having a recess on its under face sized to accommodate one rod diameter, the top parts of the cones of the conical rollers being eccentric, so as to shake or vibrate the rods in the adjacent portion of said space on rotation of said feed rollers.

2. Feeding apparatus according to claim 1 characterised by the fact that the axes of the feed rollers are at right angle to the axes of the rods.

3. Feeding apparatus according to claim 1, characterised by the fact that the axes of the feed rollers form an oblique angle with the rod axes.

4. Feeding apparatus according to claim 1, characterised by the fact that the top ends of the cones of the feed rollers are slanted and are disposed at an angle to the cone axis.

KARL KLOPFER.